US009380694B2

(12) United States Patent
Kuku et al.

(10) Patent No.: US 9,380,694 B2
(45) Date of Patent: Jun. 28, 2016

(54) PLASMA TORCH HAVING AN EXTERNALLY ADJUSTABLE ANODE AND CATHODE

(71) Applicants: Lai O. Kuku, Gilbert, AZ (US); Michael Philip Woudenberg, Phoenix, AZ (US)

(72) Inventors: Lai O. Kuku, Gilbert, AZ (US); Michael Philip Woudenberg, Phoenix, AZ (US)

(73) Assignee: MILLENIUM SYNTHFUELS CORPORATION, Gilbert, AZ (US)

( * ) Notice: Subject to any disclaimer, the term of this patent is extended or adjusted under 35 U.S.C. 154(b) by 0 days.

(21) Appl. No.: 14/687,918

(22) Filed: Apr. 16, 2015

(65) Prior Publication Data

US 2015/0305133 A1 Oct. 22, 2015

Related U.S. Application Data

(60) Provisional application No. 61/981,148, filed on Apr. 17, 2014.

(51) Int. Cl.

| | |
|---|---|
| ***B23K 10/00*** | (2006.01) |
| ***H05H 1/34*** | (2006.01) |
| ***H05H 1/48*** | (2006.01) |

(52) U.S. Cl.

CPC . *H05H 1/34* (2013.01); *H05H 1/48* (2013.01); *H05H 2001/3431* (2013.01)

(58) Field of Classification Search

CPC ... H05H 1/34; H05H 1/26; H05H 2001/3431; H05H 1/48

USPC ............. 219/121.52, 121.36, 121.48, 121.51, 219/75, 121.59, 121.5

See application file for complete search history.

(56) References Cited

U.S. PATENT DOCUMENTS

| | | | | |
|---|---|---|---|---|
| 2,964,678 | A * | 12/1960 | Reid | H05H 1/48 219/383 |
| 3,304,457 | A * | 2/1967 | Mastrup | H01T 1/00 313/231.71 |
| 3,319,097 | A * | 5/1967 | Giannini | H05H 1/34 165/104.25 |
| 6,610,959 | B2 * | 8/2003 | Carlson | B05B 7/224 219/76.12 |
| 7,022,155 | B2 | 4/2006 | Deegan et al. | |
| 7,232,975 | B2 * | 6/2007 | Kong | H05H 1/44 219/121.36 |
| 7,659,488 | B2 | 2/2010 | Cook et al. | |
| 7,977,599 | B2 | 7/2011 | Adams | |
| 2005/0016968 | A1 | 1/2005 | Faslivi et al. | |
| 2006/0255093 | A1 * | 11/2006 | Wimroither | B23K 9/1735 228/101 |
| 2012/0267346 | A1 * | 10/2012 | Kao | H01J 37/32082 219/121.52 |

* cited by examiner

*Primary Examiner* — Mark Paschall

(57) ABSTRACT

A plasma torch is provided and adapted to generate very high operating temperatures to gasify various types of materials, such as biomass materials and various carbonaceous materials. The plasma torch is composed of a ceramic body that has first, second, and third intersecting bores. Each of the first, second, and third intersecting bores defines a threaded portion therein. A first and second tungsten carbide electrode is adjustably disposed in the first and second intersecting bores and operative to be adjustable to establish a controlled gap size therebetween. A compressed gas connection is threadably disposed in the threaded portion of the third bore and is operative to introduce a flow of compressed gas through the controlled gap. The first and second tungsten carbide electrodes are connectable to a source of electrical energy and functions to produce an electrical arc across the controlled gap. The resulting flame produced by the electrical arc burns at an extreme temperature.

17 Claims, 2 Drawing Sheets

PLASMA TORCH HAVING AN EXTERNALLY ADJUSTABLE ANODE AND CATHODE

TECHNICAL FIELD

This invention relates to the apparatus and application of a plasma torch used for the gasification of biomass fuels, copper, aluminum, carbonaceous, etc.

BACKGROUND

Various plasma torches are known and available. Many are used to cut thin metals for the production of metal art while others are used in furnaces to melt or gasify materials such as coal, metal, copper, aluminum, biomass and other types of materials. Some plasma torch furnaces are used to produce fine powders, such as, aluminum powders. Many applications of plasma torches uses temperatures under 1000 degrees C., while other applications may go up to 7,000 degrees C. to 10,000 degrees C. In all of the noted applications, the plasma torch(s) used are based on the same principles. A body is provided that has two different electrodes disposed therein spaced from one another at a predetermined fixed distance. By directing electrical current through one of the electrodes (anode), an arc is generated from the anode to the other electrode (cathode). By directing a known gas across the space between the anode and the cathode, a high temperature plasma flame is generated. Various metals have been used in the past to make plasma torches. Generally the body is made of a metal and utilizes various forms of cooling systems to remove the high heat from the body that is absorbed during the melting process. The added cooling systems are both costly and bulky. It would be advantageous to have a plasma torch that does not require a complicated cooling system and can operate at higher temperatures.

The electrodes that are used in known plasma torches are typically made from high conductivity metals, such as, copper, aluminum, silver, graphite and various combinations of these metals. Some known combinations are copper/aluminum, copper/silver, and copper/graphite. Likewise, hard coatings, such as tungsten surface coating, have been applied to different metals to provide a surface that can more readily resist the extreme heat and wear resulting from continued exposure to the arc generated between the electrodes.

Various problems and disadvantages have been experience by using various ones of the known plasma torches. The life of the known plasma torches is one of the problems. Many known plasma torches last only 220-400 hours during continued usage. As the operating temperature is increased, the life of the plasma torch is decreased. Most known high temperature plasma torches are limited to an operating temperature of generally up to 10,000 degrees C. At such high operating temperatures, the generated arc between the electrodes cause high wear on the surfaces of the electrodes. Since the electrodes are secured in a permanent position, it is time consuming and costly to replace the electrodes. Many times it is necessary to replace the entire plasma torch. As can be appreciated, by increasing the current and amperage, the wear on the electrodes will likewise increase. It is desirable to have a plasma torch that will overcome one or more of the problems or disadvantages set forth above.

SUMMARY OF THE INVENTION

According to the present invention, a plasma torch is provided wherein the body is made of a ceramic material and has a first bore, a second bore, and a third bore, each intersecting with each other. A first threaded portion is defined in the first bore, a second threaded portion is defined in the second bore and a third threaded portion is defined in the third bore. A first tungsten carbide electrode having an external threaded portion is threadably disposed in the first threaded portion of the first bore, a second tungsten carbide electrode having an external threaded portion is threadably disposed in the threaded portion of the second bore and a compressed gas fitting is threadably disposed in the threaded portion of the third bore.

The use of a ceramic body allows the use of the subject plasma torch without the need of a complicated cooling system. Likewise, with the use of tungsten carbide electrodes, high wear on the electrodes, from the generated arc, is lessened. Furthermore, the ease in adjusting the electrodes relative to each other eliminates the need to change the electrodes so often. The ease of adjusting also permits the flexibility of adjusting the generated arc for the most optimal arc generation Additionally, the electrodes may be quickly changed while also securing the electrodes in a desired position. The subject plasma torch can operate at higher temperatures than others, be used for longer periods of time and has a longer life than others.

Other objects, features, and advantages of the subject concept will become more apparent from the following detailed description of the preferred embodiments and certain modification thereof when taken together with the accompanying drawings.

DETAILED DESCRIPTION

Figure 1:
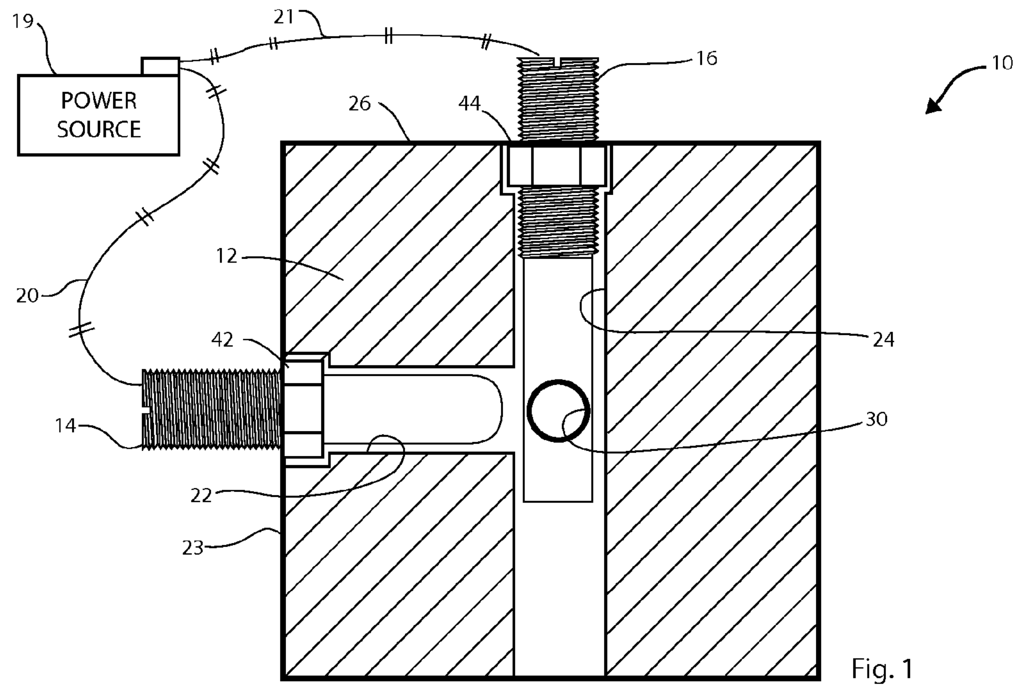
FIG. 1 illustrates a cross-sectional view of the ceramic body taken through the respective two electrodes.
Figure 2:
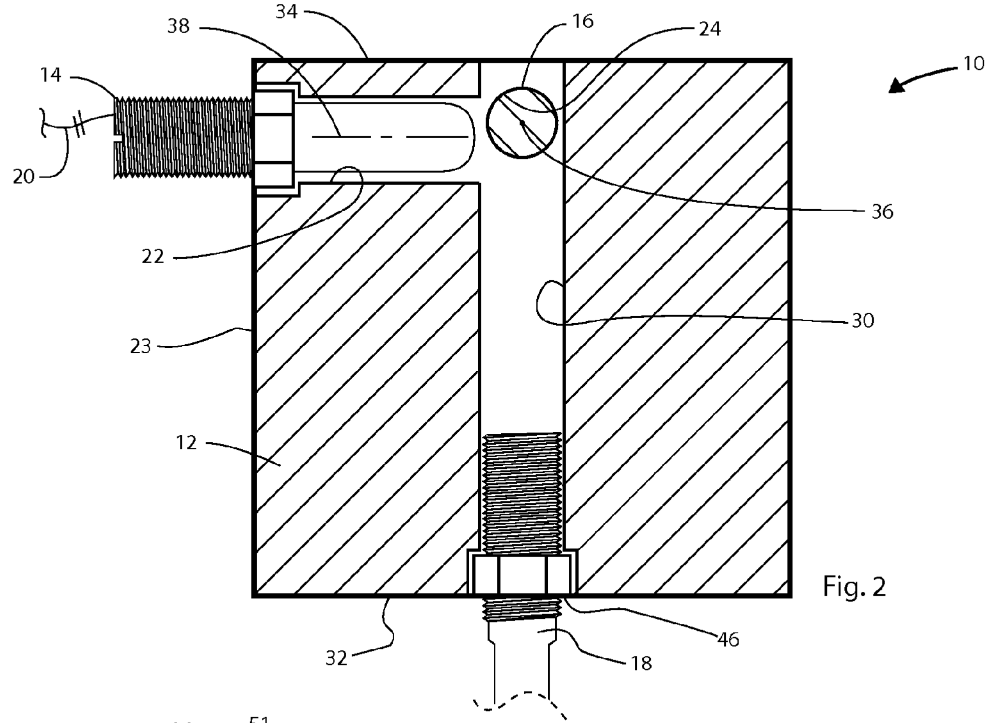
FIG. 2 illustrates a cross-sectional view of the ceramic body taken through one of the two electrodes and the compressed gas bore and being generally perpendicular to the view of FIG. 1.

Referring to FIGS. 1 & 2, a general representation of a plasma torch 10 is disclosed and includes a ceramic body 12, a first tungsten carbide electrode 14 adjustably disposed in the ceramic body 12, a second tungsten carbide electrode 16 adjustably disposed in the ceramic body 12 and a compressed gas connection 18 disposed in the carbide body. Also illustrated is a source 19 of electrical energy and associated positive and negative connections 20,21. The positive and negative connections 20,21 are connected to the respective ones of the first and second tungsten carbide electrodes 14,16.

Figure 3:
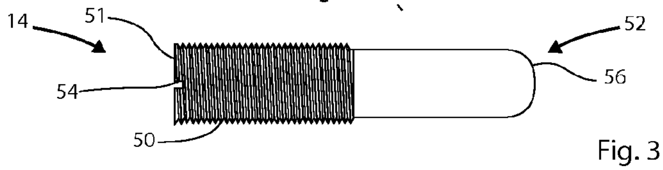
FIG. 3 illustrates one of the electrodes.

A first bore 22 is defined in the ceramic body 12 and extends from one side 23 thereof into the ceramic body 12. A second bore 24 is defined in the ceramic body 12 and extends from a second side 26 thereof into the ceramic body 12. The second bore 24 intersects with and extends beyond the first bore 22. A third bore 30 is defined in the ceramic body 12 and intersects with both the first and second bores 22,24. The location of the intersection of the third bore 30 with respect to each of the first and second bores 22,24 is generally perpendicular with each. The third bore 30 extends from a third side 32 of the ceramic body 12 to an opposed, fourth side 34 thereof. A center line 36 of the second bore 24 is defined in the ceramic body 12 and is offset nearer to the opposed, fourth side 34 than a center line 38 of the first bore 22 (FIG. 3). The ceramic body 12, as illustrated in FIGS. 1 & 2, has a generally multi-sided shape. However, it is recognized that the shape could be cylindrical, tubular or hexagonal.

A first internally threaded insert 42 is disposed in the first bore 22 of the ceramic body 12 generally adjacent the first side 23, a second internally threaded insert 44 is disposed in the second bore 24 of ceramic body 12 generally adjacent the second side 26 and a third internally threaded insert 46 is disposed in the third bore 30 of the ceramic body 12 generally adjacent the third side 32. It is recognized that the internal threads of each of the first, second, and third internally threaded inserts 42,44,46 could be formed directly in the ceramic body 12 without departing from the essence of the subject invention.

Referring to FIG. 3, the first tungsten carbide electrode 14 is more clearly illustrated. The first tungsten carbide electrode 14 has a threaded portion 50 disposed on the perimeter thereof and extends from one end 51 thereof a predetermined distance. The remaining distance to an opposed end 52 thereof has a reduced diameter that is operative to permit the reduced diameter to slide within the first bore 22 of the ceramic body 12. A slot 54 is defined in the one end 51 of the first tungsten carbide electrode 14 adjacent the threaded portion 50 and operative to permit easy adjustment of the first tungsten carbide electrode 14 within the first bore 22. The opposed end 52 of the first tungsten carbide electrode 14 has a generally bullet shaped nose 56 as illustrated. It is recognized that the shape could vary from the bullet nose shape 56 to a flat nose without departing from the essence of the subject invention. In the embodiment illustrated in FIGS. 1 & 2, the first tungsten carbide electrode 14 could serve as the anode.

Figure 4:
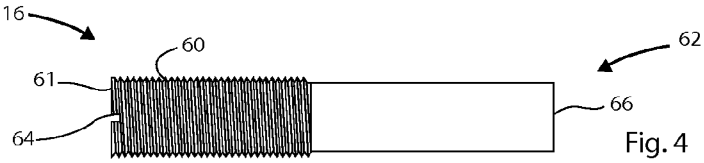
FIG. 4 illustrates another of the electrodes.

Referring to FIG. 4, the second tungsten carbide electrode 16 is illustrated more clearly. The second tungsten carbide electrode 16 has a threaded end portion 60 disposed on the perimeter thereof and extends from one end 61 thereof a predetermined distance. The remaining distance thereof to an opposed end 62 has a reduced diameter that is operative to permit the reduced diameter to slide within the second bore 24 of the ceramic body 12. A slot 64 is defined in the one end 61 of the first tungsten carbide electrode 16 adjacent the threaded end portion 60 and operative to permit easy adjustment of the second tungsten carbide electrode 16 within the second bore 24. The opposed end 62 of the second tungsten carbide electrode 16 has a generally flat shape 66 as illustrated. It is recognized that the shape could vary from the flat shape and to a bullet nose shape without departing from the essence of the subject invention. In the embodiment illustrated in FIGS. 1 & 2, the second tungsten carbide electrode 16 could serve as the cathode.

The first tungsten carbide electrode 14 is threadably received in the internal threads of the first internally threaded insert 42 and is operative to move further into or out of the first bore 22 to establish a desired distance between the opposed end 52 thereof and the side of the second tungsten carbide electrode 16. The second tungsten carbide electrode 16 is threadably received in the internal threads of the second internally threaded insert 44 and is operative to move further into or out of the second bore 24 to expose an unused portion of the reduced diameter of the second tungsten carbide electrode 16 to the opposed end 52 of the first tungsten carbide electrode 14. Since the first and second tungsten carbide electrodes 14,16 are substantially pure tungsten carbide, they will wear better and more efficiently conduct the electrical energy therethrough. In addition, the compressed gas connection is threadably disposed in the third internally threaded insert 46. The compressed gas connection is operatively connected to a source of compressed gas. The source of compressed gas could be various types or combinations of compressed gas, for example, such as; air, nitrogen, noble gases, etc. It is recognized that the first and second tungsten carbide electrodes 14,16 could be interchangeably used as the anode and cathode.

As illustrated in FIG. 1, the first tungsten carbide electrode 14 is connected to the source 19 of electrical energy by a positive electrical connection 20. The second tungsten carbide electrode 16 is connected to the source 19 of electrical energy by a negative electrical connection 21. The source 19 of electrical energy has the controls therein that are operative to control the voltage and the amperage as desired.

Figure 5:
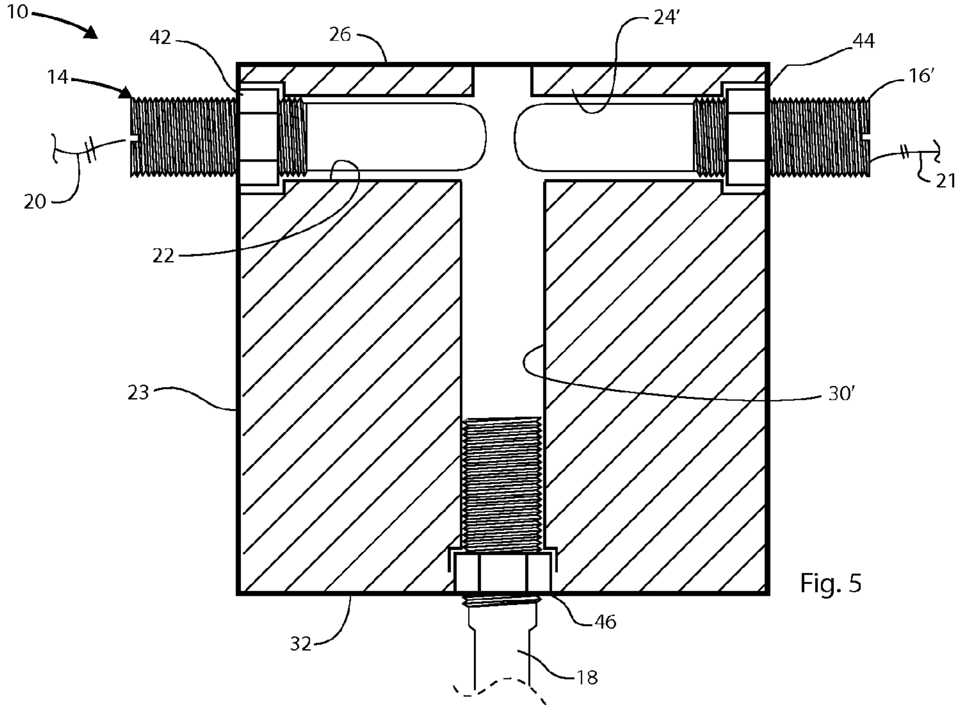
FIG. 5 illustrates another embodiment of a cross-sectional view of the ceramic body taken through the respective bores of the two electrodes and the compressed gas bore.
Figure 6:
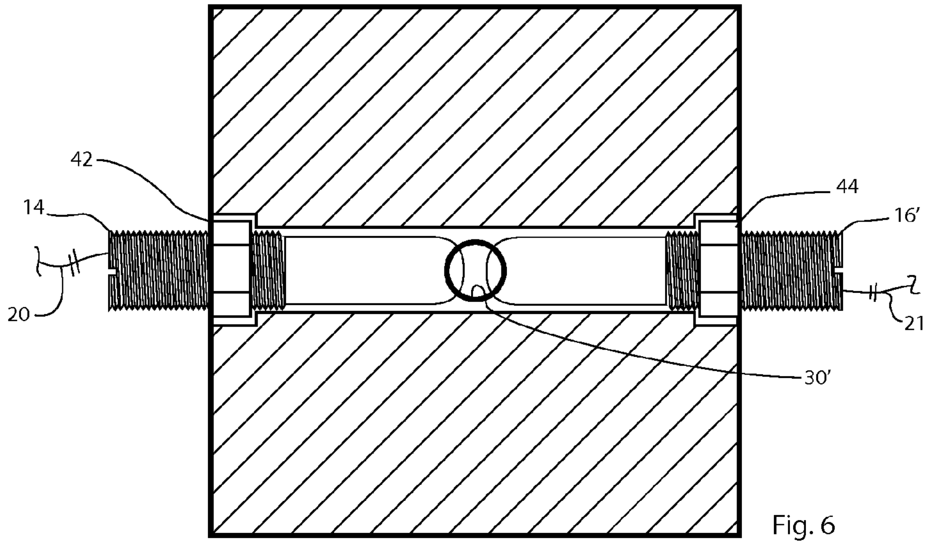
FIG. 6 illustrates a cross-sectional view of the ceramic body taken through the electrode bores and being generally perpendicular to the view of FIG. 5.

Referring to FIGS. 5 & 6, another embodiment is illustrated. Like elements have like element numbers. Element numbers having a prime (') attached indicates similar elements from FIGS. 1 & 2 having modifications made to them. The first bore 22 of FIGS. 5 & 6 is the same as that of FIGS. 1 & 2. However, the second bore 22' of FIGS. 5 & 6 is diametrically opposed to the first bore 22. They still intersect with each other but on a common plane. The third bore 30' of FIGS. 5 & 6 is basically the same as that of FIGS. 1 & 2 with the exception that the third bore 30' is reduced in size near the exit to the opposed side 26 of the ceramic body 12. The third bore 30' intersects the first and second bores 22,24' at their intersection point and along the same plane as illustrated.

The first tungsten carbide electrode 14 and the second tungsten carbide electrode 16' of FIGS. 5 & 6 are substantially the same and are each connected to the source 19 of electrical energy by the respective positive and negative electrical connections 20,21 in the same manner. It is recognized that the bullet nose shape 56 of each tungsten carbide electrode 14,16' could be different without departing from the essence of the subject invention.

It is recognized that various types of electrical connections 20,21 could be used to connect the source 19 of electrical energy to the first and second tungsten carbide electrodes 14,16. Likewise, various known systems/apparatus could be used to vary the voltage and amperage being directed to the first and second tungsten carbide electrodes 14,16 of the subject plasma torch 10.

INDUSTRIAL APPLICABILITY

The subject plasma torch 10 provides an efficient, high temperature, long lasting and self-cooled plasma torch. During operation, electrical energy is directed through the positive electrical connection 20 to the first tungsten carbide electrode 14 (anode) and the negative electrical connection 21 provides a path for the electrical energy to return to the source 19 to complete the electrical path. As a result of the controlled spacing between the anode 14 and the second tungsten carbide electrode 16 (cathode), an optimal spark is generated therebetween.

By passing the compressed gas through the connection 18, through the third bore 30, and through the generated arc between the first and second tungsten carbide electrodes 14,16 as controlled by the gap therebetween, a plasma gas/flame is produced. Based on the voltage and amperage, the intensity of the produced plasma flame is controlled. As previously set forth, the produced plasma flame can produce operating temperatures well in excess of 10,000 degrees C. As the duration of the plasma torch 10 being used continues for long periods of time, it may be necessary to adjust one or both of the first and second tungsten carbide electrodes 14,16. The adjustment will once again optimize the electrical arc being generated between the first and second tungsten carbide electrodes 14,16. By using the subject plasma torch 10, the total life thereof far exceeds known plasma torches.

The subject plasma torch 10 can be utilized to gasify various types of materials, such as biomass and many different types of carbonaceous materials. Since the operating temperatures of the subject plasma torch is so high, the gasified gases (syngas) is very clean as compared to other plasma torches. This is true because the extremely high operating temperatures vaporize many of the unwanted gases that are normally present in produced syngas. By vaporizing many unwanted gases from the syngas, additional steps are not needed to remove them in order to attain the desired syngas that has a desired relationship between the retain hydrogen and carbon monoxide gases.

Other embodiments as well as certain variations and modifications of the embodiments herein shown and described will obviously occur to those skilled in the art upon becoming familiar with the underlying concept. It is to be understood, therefore, that the subject design may be practiced otherwise than so specifically set forth above.

What is claimed is:

1. A plasma torch comprising:

a ceramic body having a plurality of side surfaces and defining a first bore, a second bore, and a third bore, each of the first, second and third bores define a central axes, the bore and axis of the first bore intersects with and is oriented with the bore and axis of the second bore in one of being generally perpendicular therewith and being generally along the same axis therewith, the bore and axis of the third bore extends through the ceramic body and intersects with and is oriented generally perpendicular with each of the axes and bores of the first and second bores, a first threaded portion is defined in the first bore and a second threaded portion is defined in the second bore;

a first externally adjustable tungsten carbide electrode being threadably disposed in the first threaded portion of the first bore;

a second externally adjustable tungsten carbide electrode being threadably disposed in the second threaded portion of the second bore; and the third bore being operatively connectable to a source of compressed gas and operative to direct the compressed gas through the third bore.

2. The plasma torch of claim 1, wherein the compressed gas is compressed air.

3. The plasma torch of 1, wherein each of the first and second tungsten carbide electrodes has a threaded portion disposed thereon generally adjacent one end thereof and adaptable to threadably mate with the respective first and second threaded portions defined in the first and second bores.

4. The plasma torch of claim 1 wherein the first tungsten carbide electrode is the anode of the plasma torch and the second tungsten carbide electrode is the cathode of the plasma torch.

5. The plasma torch of claim 4 wherein the axes of the first bore and the second bore intersect each other generally at ninety degrees and the second bore extends beyond the intersection with the first bore.

6. The plasma torch of claim 4, wherein the first bore and the second bore are coaxial with one another.

7. The plasma torch of claim 4, where the ceramic body has first, second, third and fourth side surfaces, and the first bore extends from the first side surface, the second bore extends from the second side surface and the axis of the third bore extends through the body from the third side thereof to the opposed, fourth side thereof and intersects the respective axes of the first and second bores generally perpendicular to their respective axes.

8. The plasma torch of claim 5, wherein the axis of the second bore is offset towards the opposed, fourth side of the ceramic body relative to the axis of the first bore.

9. The plasma torch of claim 3, wherein the end opposed to the threaded portion of each of the first and second tungsten carbide electrodes is one of generally bullet shaped or flat.

10. The plasma torch of claim 1 wherein the bore and axis of the first bore intersects with and is oriented with the bore and axis of the second bore generally along the same axis therewith, and the ends opposed to the threaded portion of each of the first and second tungsten carbide electrodes is generally bullet shaped.

11. The plasma torch of claim 5, wherein the end opposed to the threaded portion of the first tungsten carbide electrode is generally bullet shaped and the end opposed to the threaded portion of the second tungsten carbide electrode is generally flat.

12. The plasma torch of claim 1, wherein the first and second threaded portions defined in the ceramic body are produced by forming threads within the ceramic body.

13. The plasma torch of claim 1, wherein the first and second tungsten carbide electrodes are operatively connectable to a source of electrical energy.

14. The plasma torch of claim 13, wherein the source of electrical energy has positive and negative poles and the poles of the source of electrical energy may be alternately connected to the first and second tungsten carbide electrodes.

15. The plasma torch of claim 1 wherein the ceramic body has a cross-section, when taken along the axes of the first bore and the second bore, which is one of multi-sided, cylindrical, and tubular.

16. The plasma torch of claim 15, wherein the ceramic body has a cross-section, when taken along the axes of the first bore and the second bore, that is multi-sided.

17. The plasma torch of claim 1 in combination with a power source having a variable power rate and the first and second tungsten carbide electrodes being operatively connectable to the variable power rate.

* * * * *